United States Patent [19]

Rubin

[11] 4,004,435
[45] Jan. 25, 1977

[54] DEVICE FOR NON-ROTATABLY SECURING THE OUTER MEMBER OF A JOINT TO A FLANGE OR SHAFT

[75] Inventor: Wolfgang Rubin, Steinheim, Germany

[73] Assignee: Lohr & Bromkamp GmbH, Germany

[22] Filed: June 23, 1975

[21] Appl. No.: 589,582

[30] Foreign Application Priority Data

July 22, 1974 Germany .................... 7421287[U]

[52] U.S. Cl. ..................................... 64/32 R; 64/8; 64/21
[51] Int. Cl.² .......................... F16D 3/84; F16D 3/30
[58] Field of Search ............ 64/21, 8, 7, 32 R, 32 F

[56] References Cited

UNITED STATES PATENTS

| | | | |
|---|---|---|---|
| 3,204,429 | 9/1965 | Kayser | 64/21 |
| 3,370,441 | 2/1968 | Aucktor | 64/21 |
| 3,464,232 | 9/1969 | Hutchinson | 64/21 |
| 3,541,809 | 11/1970 | Howey | 64/21 |
| 3,656,318 | 4/1972 | Smith | 64/21 |

*Primary Examiner*—Samuel Scott
*Assistant Examiner*—Randall Heald
*Attorney, Agent, or Firm*—Edmund M. Jaskiewicz

[57] ABSTRACT

The outer member of a joint is drivingly connected by torque transmitting elements to an inner joint member and has a circumference with a polygonal configuration. A sleeve of a corresponding polygonal configuration is positioned over the outer joint member and is connected to a flange of similar polygonal configuration or to a shaft. The sleeve is retained on the outer joint member against axial displacement by a shoulder or collar on one end of the sleeve and by a detachable ring at the other end of the sleeve.

6 Claims, 6 Drawing Figures

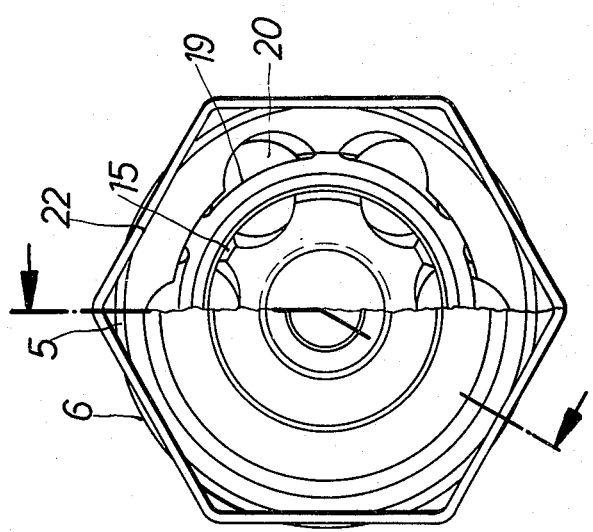
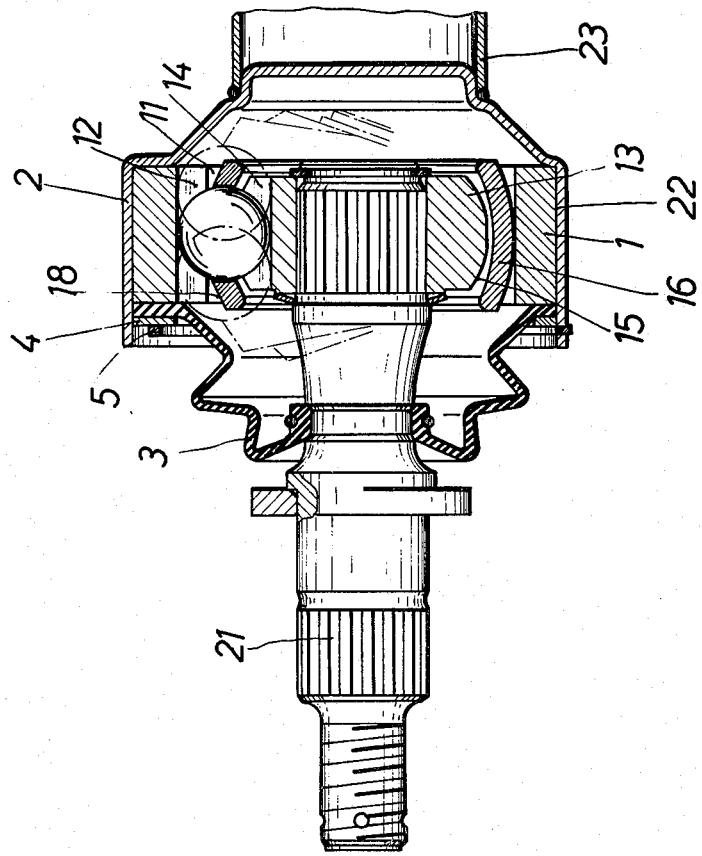

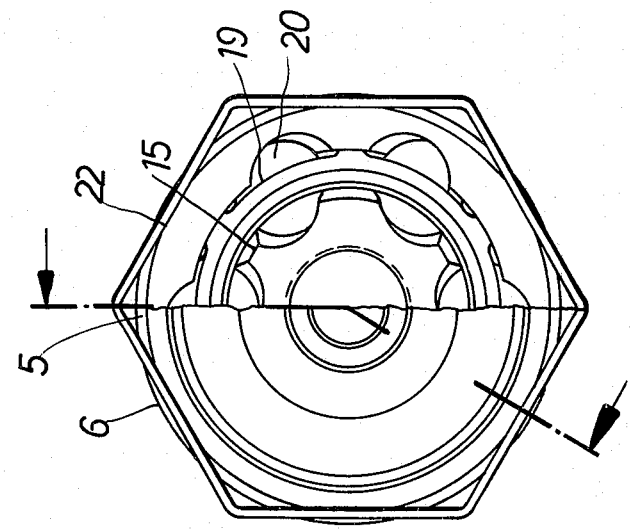
Fig. 3
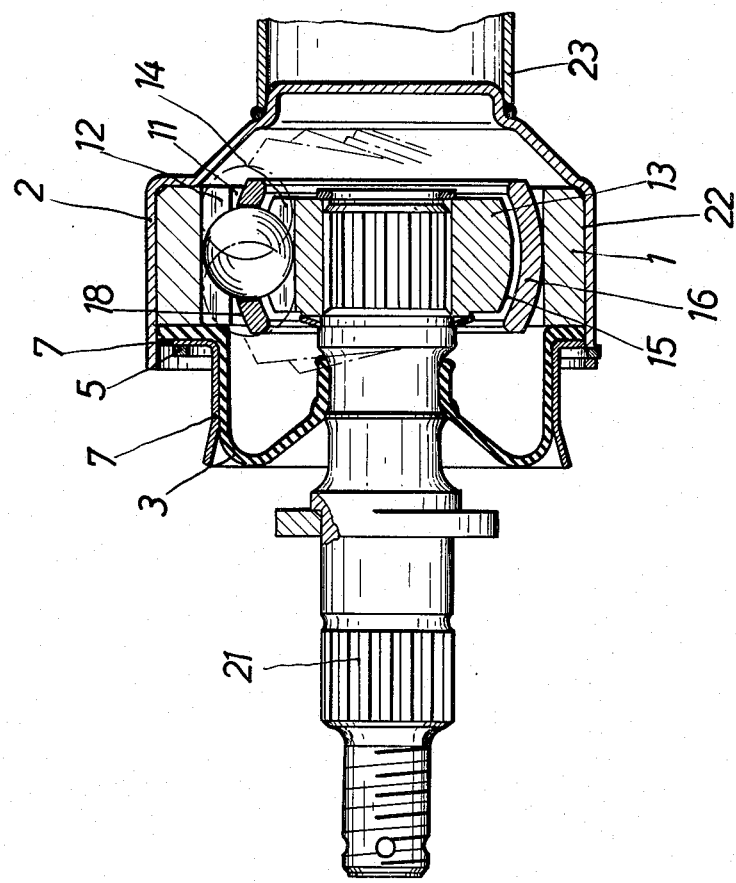
Fig. 4 (A-B)

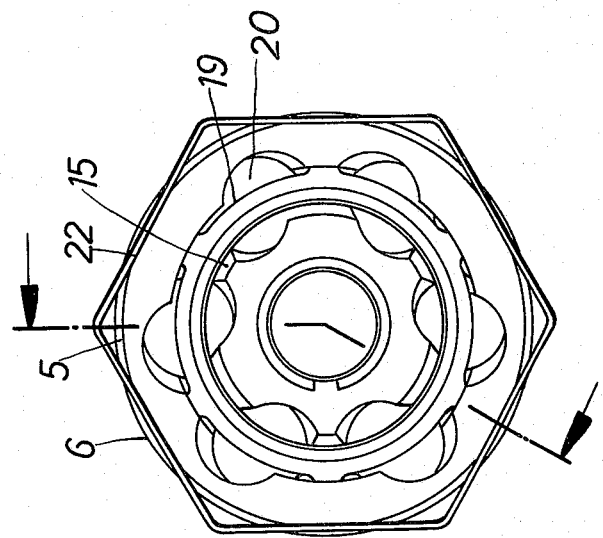
Fig. 6
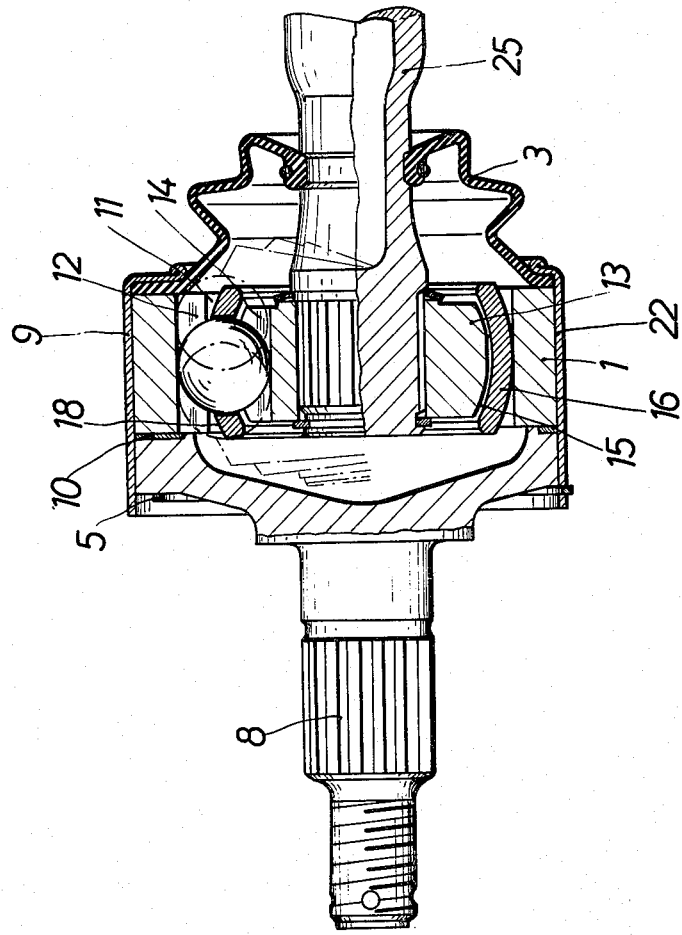
Fig. 5 (A-B)

DEVICE FOR NON-ROTATABLY SECURING THE OUTER MEMBER OF A JOINT TO A FLANGE OR SHAFT

The present invention relates to a joint having an outer joint member which is drivingly connected to an inner joint member by torque transmitting elements, more particularly, to non-rotatably securing the outer member of the joint to a flange or shaft.

In such torque transmitting joints, including universal joints, known up to the present time various forms of connections have been proposed between the outer joint member and a shaft, such as a driving or driven shaft. Where such a connection was in the form of a detachable connection the connection generally involved flanges and threaded bolts or pins so as to require a relatively large space and was expensive in construction. Where such a connection was in the nature of a permanent connection the outer joint member was generally welded to the shaft. In such a permanent connection replacement of the shaft was extremely expensive and difficult since not only must the joint be replaced but also the parts to which components of the joint were welded.

Various other semi-detachable connections have been proposed wherein one component, such as the outer joint member, was provided with a toothed or splined configuration into which the other component such as a sleeve or shaft was press - fitted. However, such a connection had the disadvantage that it could be disassembled only once and it was then necessary to provide new components for subsequent assemblies. Further, such a connection was relatively expensive and required special tools for disassembly and assembly.

It is therefore the principal object of the present invention to provide a novel and improved connection between the outer joint member of such a joint and a flange or shaft.

It is another object of the present invention to provide such a connection which is detachable, simple in construction and requires a minimum of time and labor in disassembly and assembly.

According to one aspect of the present invention a joint has an outer joint member which is drivingly interconnected by a plurality of torque transmitting elements to an inner joint member. The outer joint member has a circumference having a polygonal configuration transverse to the axis of rotation of the joint. A sleeve of corresponding polygonal configuration surrounds the outer joint member and is adapted for connection to a flange of similar polygonal configuration or to a shaft. The shaft has means at one end thereof and detachable means on the other end thereof for securing the sleeve against axial displacement with respect to the outer joint member such that the outer joint member is non-rotatably secured by said sleeve to a shaft or flange connected to the sleeve.

The connection does not require any screws or bolts and the external diameter of the joint is considerably reduced with respect to corresponding joints of similar capacity.

Other objects and advantages of the present invention will be apparent upon reference to the accompanying description when taken in conjunction with the following drawings, which are exemplary, wherein;

FIG. 1 is an elevational view partially in section of a constant velocity sliding joint having torque transmitting balls and incorporating the present invention;

FIG. 2 is a sectional view taken along the line II—II of FIG. 1;

FIG. 3 is a view similar to that of FIG. 1 but of a joint intended as a high speed joint;

FIG. 4 is a sectional view taken along the line IV—IV of FIG. 3;

FIG. 5 is a sectional view taken along the line V—V of FIG. 6 of a constant velocity sliding joint having torque transmitting balls wherein a solid shaft is connected with the outer joint member by a metal sleeve according to the present invention; and FIG. 6 is a side elevational view of the joint of FIG. 5 but with the solid shaft being removed.

Proceeding next to the drawings wherein like reference symbols will indicate the same parts throughout the various views a specific embodiment and modifications of the present invention will be described in detail.

In FIGS. 1 and 2 there is shown a constant velocity torque transmitting universal joint of the sliding type comprising an outer joint member 1 through which is an axial cylindrical bore 11. A plurality of track grooves 12 are circumferentially spaced around the inner wall of the bore 11 and are all inclined with respect to the longitudinal axis of the joint at a predetermined angle.

Within the bore 11 is an inner joint member 13 having a spherical outer face 15 in which are formed a plurality of longitudinal track grooves 14 inclined with respect to the longitudinal axis of the joint at a predetermined angle. A retainer cage 16 is positioned between the outer joint member 1 and the inner joint member 13 and has an outer convex spherical face 18 which is guided upon the cylindrical surface of the bore 11 of the outer joint member. Formed within the cage 16 is a plurality of circumferentially spaced apertures or openings in which are retained torque transmitting balls 20 which are also received in opposed pairs of grooves 12 and 14 in the outer and inner joint members 1 and 13 respectively.

The inner joint member 13 is provided with a bore in which is secured a shaft pin 21 which may take the specific form of an axle shaft such as would be used on front axles of vehicles wherein the wheels to be mounted on the axle shaft are to be both steerable and driven.

A flexible pleated sealing boot 3 of rubber or a similar material has one end secured to the shaft 21. The other end of the boot 3 is provided with a flanged portion which is secured to the outer joint member 1 in a manner to be presently described.

The outer joint member 1 has a circumference 22 which is of hexagonal configuration transversely of the longitudinal axis of the joint. Other suitable polygonal configurations may also be employed. A deep drawn sheet metal cap or sleeve 2 has a similar polygonal configuration so as to be positioned closely over the circumference of the outer joint member. A tubular shaft 23 is securely attached to the cap 2 such as by welding. The cap or sleeve 2 may also be of a construction to receive a flange or fork element of a joint. The cap 2 is formed with an annular shoulder 26 which engages an end face of the outer joint member 1 as shown in FIG. 2.

At the other end of the sleeve 2 a detachable ring 5 is received within a groove 6 which is cut in the faces of the polygonal cap 2 as can be seen in FIG. 1. An intermediate ring 4 is positioned against a flange portion of the boot 3 so that this flange portion of the boot is urged against an end face of the outer joint member 1 by means of the detachable ring 5. The flanged end of the boot 3 is similarly of a hexagonal shape and thus when the flange is mounted in the position as shown effectively seals off the interior space of the joint.

The abovedescribed construction thus rigidly connects the outer joint member 1 with the tubular shaft 23.

The polygonal configuration of the cap 2 has a number of angles or corners which corresponds to the number of or to a whole number multiple of the number of torque transmitting balls 20 employed in the joint. In the present embodiment six balls 20 are employed and the angles or corners of the polygonal cap 2 are positioned on radial lines which extend from the center of the joint and pass through the centers of the torque transmitting balls.

It is noted that the ring 5 at one end of the outer joint member 1 is employed as an internal securing ring and is fixed in a groove comprising a plurality of cuts made in the faces of the polygonal sleeve 2. The ring may also be in the form of an external securing ring and is retained in a groove which is cut into the corners or angles of the polygonal cap 2. When an internal securing ring is used, a plurality of annular elements or washers are interposed between the ring and the end surface of the outer joint member to securely apply the sealing boot 3 against the outer joint member.

In FIGS. 3 and 4 there is illustrated a constant velocity rotary joint embodying the same principle of the joint illustrated in FIGS. 1 and 2 but particularly adapted to be employed as a high speed joint. In the joint of FIGS. 3 and 4 there is provided a sheet metal jacket or sleeve 7 positioned around the boot 3 so as to absorb centrifugal forces generated by the lubricant within the boot 3 when the joint is rotating at a high speed. Further, the sleeve 7 is provided with a flange 7' which is used in place of the intermediate ring 4 in FIGS. 1 and 2 to press the sealing boot 3 firmly against the outer joint member 1 and thus to seal off the interior of the joint.

In FIGS. 5 and 6 there is shown a constant velocity universal joint which is basically similar to the joint shown in FIGS. 1 and 2 but is provided with a hexagonal sleeve 9 which fastens over one end of a flexible pleated boot 3 whose other end is secured to a shaft 25 the inner end of which is secured within the inner joint member 13. The other end of the sleeve 9 extends over a hexagonal flange or fork 8' extending from axle pin 8. A sealing ring 10 is interposed between the end of the outer joint member 1 and the flange 8'. The detachable ring 5 is positioned in the groove 6 in the same manner as described above and the ring 5 bears against the outer surface of the flange 8' as shown in FIG. 5.

Thus it can be seen that the present invention has described a device for rigidly and securely connecting the outer joint member of a joint to a tubular or hollow shaft or to a flange. Further, the structure for the connection is readily detachable to permit disassembly of the joint and the structure occupies a minimum of space. No connecting bolts or screws are required and the external diameter of a joint incorporating the present invention is substantially the same as the joint itself. The outer joint member can be readily disconnected from the shaft with a minimum of effort and thus maintenance and repair costs of the joint are significantly decreased.

It will be understood that this invention is susceptible to modification in order to adapt it to different usages and conditions, and accordingly, it is desired to comprehend such modifications within this invention as may fall within the scope of appended claims.

What is claimed is:

1. In a joint having an outer joint member and inner member drivingly interconnected by a plurality of torque transmitting elements, the combination of the circumference of the outer joint member having a polygonal configuration transverse to the axis of rotation of the joint, a sleeve of corresponding polygonal configuration surrounding said outer joint member and having means thereon for connecting said sleeve to one of a flange of similar polygonal configuration or to a shaft, said sleeve having means on one end thereof and detachable means on the other end thereof engaging opposed end faces of said outer joint member for securing said sleeve against axial displacement with respect to said outer joint member such that said outer joint member is non-rotatably secured by said sleeve to one of a shaft or flange connected to said sleeve, said sleeve being axially displaceable from said outer joint member when said detachable means is detached from the sleeve.

2. In a joint as claimed in claim 1 wherein said polygonal configuration of said sleeve and outer joint member circumference comprises a plurality of angles corresponding to the plurality of torque transmitting elements, said angles being positioned on radial lines extending from the center of the joint through the centers of the torque transmitting elements.

3. In a joint as claimed in claim 1 wherein said polygonal configuration of said sleeve and said outer joint member circumference comprises a plurality of angles corresponding to a whole number multiple of the plurality of torque transmitting elements.

4. In a joint as claimed in claim 1 wherein said detachable securing means comprises a ring, therebeing an annular groove in said sleeve to receive said ring.

5. In a joint as claimed in claim 4 wherein said groove is cut into the side faces of said polygonal sleeve.

6. In a joint as claimed in claim 4 wherein there is a flexible sealing boot having one end positioned against said outer joint member, an intermediate ring against said boot one end, said detachable ring positioned against said intermediate ring to urge said boot against said outer joint member.

* * * * *